March 19, 1929.  C. DRIEST, JR  1,705,810
SCISSORS
Original Filed Feb. 9, 1922
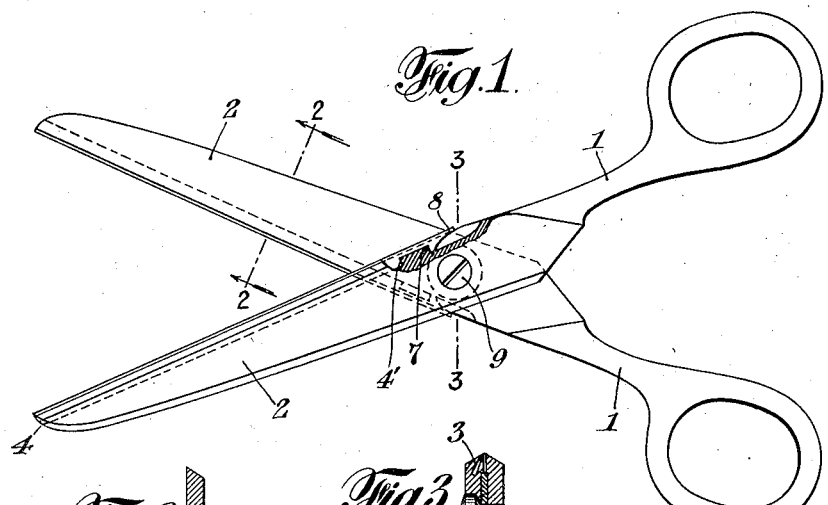
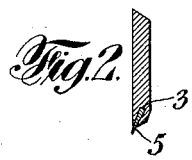
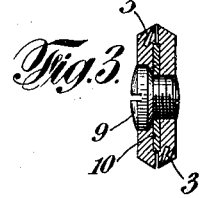
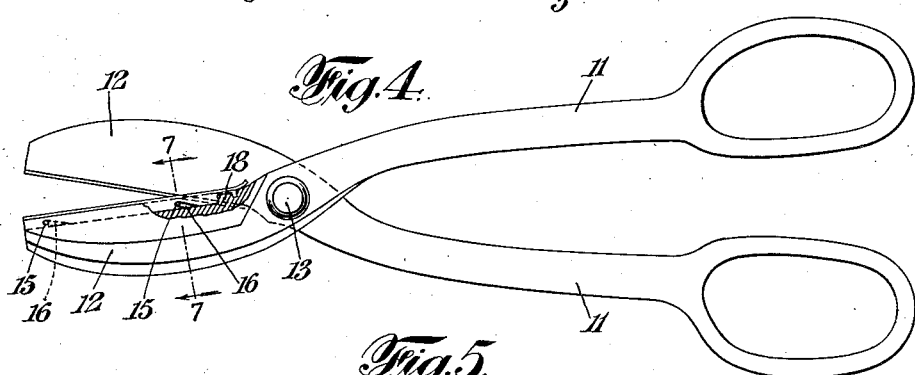
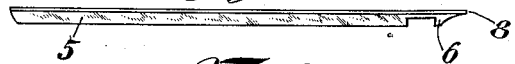
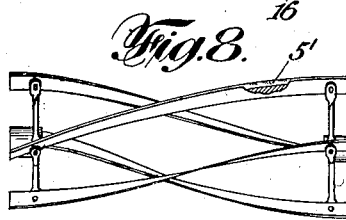
Inventor
Charles Driest Jr
By his Attorneys
Kenyon & Kenyon Patented Mar. 19, 1929.

1,705,810

UNITED STATES PATENT OFFICE.

CHARLES DRIEST, JR., OF MARLBORO, NEW JERSEY; CHARLES DRIEST, SR., ADMINISTRATOR OF SAID CHARLES DRIEST, JR., DECEASED, ASSIGNOR TO FRANK TRITSCHLER, OF HIGHLAND PARK, NEW JERSEY.

SCISSORS.

Application filed February 9, 1922, Serial No. 535,131. Renewed January 30, 1928.

My invention relates to scissors and to other means for cutting or shearing. The general object of my invention is to provide the blade used in such means with a detachable cutting edge capable of being readily inserted or removed. While a detachable blade in cutting means is not claimed as new, my invention lies in providing the member parts of the cutting means with a narrow removable cutting edge and means to attach and remove the same. My invention has many practical advantages. The integral parts of the scissors or cutting means can be constructed of material best suited for such purposes without respect to their utility as cutting material. As the cutting means become dulled, new sharpened edges can be attached. These cutting edges take up small space and are cheaply made. The cutting edge being attached to the forward edge of the cutting member, renders no change of construction in the scissors or other means necessary. For example in scissors, no extra blades are inserted on the inside parts of the scissor members.

In the drawings accompanying this specification and forming a part thereof, I have shown my invention in its preferred forms, as applied to scissors, shears and a lawn mower. It is not to be understood that I limit my invention to the uses as shown, as my invention may be applied to other forms of cutting or shearing means. Also my invention is not limited to the particular forms and means as shown. Throughout the drawings and the specification like numbers refer to like parts.

Referring to the drawing Fig. 1 shows an ordinary pair of scissors with my invention embodied. Fig. 2 is a cross section of one of the scissor members taken along the line 2—2 of Fig. 1 of the blade. Fig. 3 is a cross section taken along the line 3—3 of Fig. 1 where the two scissor members intersect. Fig. 4 shows a pair of shears adapted particularly for cutting metal, also embodying my invention but showing my detachable cutting edge in a modified form. Fig. 5 shows individually my removable cutting edge as used in Fig. 1. Fig. 6 is the modified form of cutting edge as used in the shears in Fig. 4. Fig 7 is a cross sectional view of the blade of one of the member parts of the shears in Fig. 4 with the modified form of cutting edge of Fig. 6. Fig. 8 shows my invention as applied to the cutting elements of an ordinary lawn mower.

The usual pair of scissors shown in Fig. 1 are composed of two scissor members 1, 1 having the usual beveled blades 2, 2. These blades however are not sharpened along their forward edge as is ordinarily the case. The forward edge (that is the usual cutting edge) of each scissor member, is provided with a groove 3. I first construct the groove with parallel sides and then have the edges mill rolled, so that the groove is formed narrower at its orifice than at its base as shown in Figs. 2 and 3, forming a modified triangle. The groove is shown in Fig. 1 by the dotted lines and extends between the numerals 4 and 4'. A narrow cutting edge is separately formed out of the best cutting material shaped to correspond with this groove, the cross-section being of the same triangular shape. The groove being formed of a dove-tail shape, and the cutting edge being wedge shaped, the cutting edge is held firmly and continuously throughout its length in the groove. There is no need of supplying any means of attaching the cutting edge to the blade. The construction is simple and the blades and cutting edge can be very easily and cheaply made. The cutting edge has a projection 6 at its rear end which is adapted to engage in a notch 7 cut in the scissor member when the cutting edge is inserted in the groove longitudinally from the end 4. When inserted the cross sectional shape of the groove and the cutting edge prevent the latter from being withdrawn except longitudinally out of end 4 of the groove and the engagement of the projections 6 and 7 prevent longitudinal movement. There is sufficient springiness in the cutting edge to permit the end 8 to be raised when desired and to disengage the projections 6 and 7. In this manner the blade can readily be withdrawn although until it is desired to do so it is firmly fixed. The scissor members 1, 1 are joined together by means of screw 9, a steel washer 10 being preferably inserted between the members as shown in Fig. 3.

A modified form of my cutting edge and the means to removably attach it is shown in Figs. 4 and 6. This modified form is more especially adapted to the use in heavy shears such as for cutting sheet metal than in ordinary scissors. The shear members 11, 11 having blades 12, 12 are pivoted by the stud or screw 13. The forward edge of the blades 12 are formed with a groove 14 shown in Fig. 7 and in Fig. 4, by the dotted line. The groove 14 is formed with parallel sides and is not rolled as described above for the previous groove. Pins 15, 15 are placed at intervals across the groove. The cutting edge has slant-wise notches 16. These notches may be directly slant-wise as shown or may be L shaped, and where used in my claims the former term is intended to include the latter form of notches. The cutting edge 5' is inserted directly into the groove, the notches 16, 16 catching with the pins 15, 15. As the cutting edge is inserted it must be given a slight longitudinal movement on account of the slant-wise notches. This longitudinal movement is sufficient to have projection 17 on the cutting edge catch behind a projection or pin 18. The engagement of the elements 17 and 18 prevent a longitudinal movement of the cutting edge and thus prevent its withdrawal. Again the end 19 of the cutting edge 5' may be raised and the projecting elements disengaged thus permitting the withdrawal. Until this is done however, the cutting edge is firmly fixed to the blade.

From the above it can be seen that I have provided a pair of scissors or shears with a practical and easily removable cutting edge. Instead of requiring the blades of the scissors or shears themselves to be kept sharpened and to be made of a good cutting material it is only necessary to make this thin edge of such material. As the cutting edge becomes dull new ones can be inserted and the old ones resharpened.

The principle of my invention can be utilized in connection with other means for cutting and shearing than as above shown and I do not desire to limit myself to the use of the invention alone in connection with scissors and shears. In particular the invention is useful in connection with the blades of lawn mowers. In Fig. 8 I have shown the cutting elements of the lawn mower equipped with my invention. Either form of groove and cutting edge can be utilized but in the case of a lawn mower it is preferable to use the modified form of cutting edge shown in Fig. 6, having slant-wise notches and to provide the groove formed in the forward edge of the lawn mower blade with the corresponding pins.

As shown from the drawings, particularly Figs. 2, 3 and 7, the grooves in the main or holding blades of my scissors are cut at an angle to the inner face of the blades. The detachable cutting edges when placed in these grooves extend slightly beyond the face of the holding blades as well as slightly beyond the point of said blades.

In the ordinary construction of scissors, in order to permit the two member parts of the scissors to operate together and to shear without jamming, the blades are given what is known in the trade as a "twist". The inner faces of the two members do not lie in parallel planes but rather so as to converge the one in the other so that the cutting edges only contact. In my scissors this clearance or "twist" is provided for by the extension of the cutting edges beyond the faces of the main holding blades. The inner sides of the two member parts are kept apart the right distance by means of the washer 10, while the cutting edges are brought together at the proper place. The result is that it is not necessary to twist my scissors.

The term scissors as used in the claims is meant to include shears and other such variations. The forward edge of a blade or a scissor member is the edge usually used for cutting.

What I claim as new and desire to secure by Letters Patent is:

1. In a means for cutting or shearing a shank, the forward edge of said shank being provided with a dovetailed shaped groove, a wedge-shaped blade element adapted to be inserted longitudinally in said groove, means for preventing lateral movement of said blade element, and means for preventing longitudinal movement of said element comprising a resilient member formed as an integral part of the blade element and adapted to lock said element to the shank.

2. In a means for cutting or shearing a shank, the forward edge of said shank being provided with a groove and with a shoulder at one end of the groove, a blade element adapted to seat in said groove, means for preventing lateral movement of said element, said blade element being provided with a longitudinal resilient extension and a projection on said extension adapted to engage said shoulder and to prevent longitudinal movement of said element.

3. A scissors consisting of two shanks pivoted together, the forward edges of said shanks being provided with grooves formed respectively at angles with the inner faces of the shanks, removable blade elements so shaped as to be held against lateral movement throughout the length of the respective grooves, and means for preventing longitudinal movement of said blade elements in said grooves comprising resilient members formed as integral parts of the elements and adapted to engage locking members on said shanks.

4. In a scissors, a cutting edge blade for detachable mounting in the cutting edge portion of the shank of a scissors, said blade comprising an elongated strip of hardened metal of substantially the same cross sectional dimensions throughout at least the major portion of its length and the cross sectional form of said blade being such as to provide a straight side constituting the widest side of the blade, a beveled side tapering slightly from the back of the blade to the cutting edge thereof and terminating in an abruptly beveled surface extending to said straight side and forming in conjunction therewith the cutting edge of the blade.

5. The combination with a scissors having two shanks pivoted together and grooves formed in the forward edges of said shanks and arranged angularly with reference to the straight and adjacent sides of the shanks, the outer walls of said grooves being pressed inwardly to form said grooves into V-shaped cross sectional form, of removable blade elements, the cross sectional form of which throughout the major portion of their length being the same as to the cross sectional form of said grooves and consisting of straight side faces engaging the straight sides of the grooves and opposite beveled faces engaging the inwardly set sides of said grooves, the beveled sides of said blade elements being abruptly beveled at their contracted side edges to form the cutting edges thereof, and said cutting edges extending beyond the inner adjacent faces of the shanks of the scissors, by virtue of the angular mounting of said elements in said shanks.

6. The combination with a scissors having two shanks pivoted together and grooves formed in the forward edges of said shanks and arranged angularly with reference to the straight and adjacent sides of the shanks, the outer walls of said grooves being pressed inwardly to form said grooves into V-shaped cross sectional form, or removable blade elements, the cross sectional form of which throughout the major portion of their length being the same as the cross sectional form of said grooves and consisting of straight side faces engaging the straight sides of the grooves and opposite beveled faces engaging the inwardly set sides of said grooves, the beveled sides of said blade elements being abruptly beveled at their contracted side edges to form the cutting edges thereof, said cutting edges extending beyond the inner adjacent faces of the shanks of the scissors by virtue of the angular mounting of said elements in said shanks, and means for retaining said blade elements against longitudinal movement in the grooves of said shanks.

7. A scissors consisting of two pivotally coupled shanks having adjacent surfaces, the forward edges of said shanks having grooves arranged angularly with reference to and opening in the direction of said straight surfaces, the walls of said grooves being normally parallel and the outer walls thereof being set inwardly adjacent the forward edges of the shank to form a substantially V-shaped cross sectional contour to said grooves to receive blade elements of similar cross sectional form and to retain said elements against lateral displacement from said shanks.

8. A scissors, one of the shanks of which is provided on its forward edge with a groove arranged angularly with reference to and opening into one side face of said shank, the walls of said groove being normally parallel and the outer wall thereof being set inwardly adjacent the forward edge of said shank to form a substantially V-shaped cross sectional contour to said groove to receive a blade element of similar cross sectional contour and to retain said element against lateral displacement from said shank.

In testimony whereof, I have signed my name to this specification.

CHARLES DRIEST, Jr.